x`

(12) United States Patent
Lee et al.

(10) Patent No.: US 11,442,306 B2
(45) Date of Patent: Sep. 13, 2022

(54) OPTICAL DISPLAY SYSTEM, METHOD, AND APPLICATIONS

(71) Applicant: UNIVERSITY OF CENTRAL FLORIDA RESEARCH FOUNDATION, INC., Orlando, FL (US)

(72) Inventors: Yun-han Lee, Orlando, FL (US); Fenglin Peng, Orlando, FL (US); Guanjun Tan, Oviedo, FL (US); Yishi Weng, Orlando, FL (US); Shin-Tson Wu, Oviedo, FL (US)

(73) Assignee: University of Central Florida Research Foundation, Inc, Orlando, FL (US)

( * ) Notice: Subject to any disclaimer, the term of this patent is extended or adjusted under 35 U.S.C. 154(b) by 488 days.

(21) Appl. No.: 16/435,171

(22) Filed: Jun. 7, 2019

(65) Prior Publication Data

US 2019/0285939 A1   Sep. 19, 2019

Related U.S. Application Data

(63) Continuation-in-part of application No. PCT/US2016/065755, filed on Dec. 9, 2016.

(51) Int. Cl.
| | |
|---|---|
| *G02B 27/28* | (2006.01) |
| *G02F 1/1335* | (2006.01) |
| *G02B 5/30* | (2006.01) |
| *F21V 8/00* | (2006.01) |
| *G02B 6/35* | (2006.01) |

(Continued)

(52) U.S. Cl.
CPC ..... *G02F 1/133528* (2013.01); *G02B 5/3083* (2013.01); *G02B 6/0056* (2013.01); *G02B 6/3522* (2013.01); *G02B 17/086* (2013.01); *G02B 27/0172* (2013.01);
(Continued)

(58) Field of Classification Search
None
See application file for complete search history.

(56) References Cited

U.S. PATENT DOCUMENTS

| | | |
|---|---|---|
| 8,810,878 B2 | 8/2014 | Akutsu et al. |
| 9,389,422 B1 | 7/2016 | Cakmakci et al. |

(Continued)

OTHER PUBLICATIONS

Lee, Seungjae, et al. "Additive light field displays: realization of augmented reality with holographic optical elements," ACM Transactions on Graphics (TOG) 35.4 (2016): 60.
(Continued)

*Primary Examiner* — Thanh Nhan P Nguyen
(74) *Attorney, Agent, or Firm* — Klintworth & Rozenblat IP LLP

(57) ABSTRACT

An optical display system includes an information display (image-generating) component, a polarization rotator, a polarization dependent optical element, an input holographic coupler, a light guide and an output holographic coupler. By controlling the polarization of the displayed light through the polarization rotator, the polarization dependent optical element changes the viewable content to different distances from the viewer. This enables the generation of a proper light field which will then be coupled into the light guide through the input holographic coupler, and finally go through the output holographic coupler to a user's eye.

19 Claims, 6 Drawing Sheets

(51) Int. Cl.
*G02B 17/08* (2006.01)
*G02B 27/01* (2006.01)
*G02B 30/25* (2020.01)

(52) U.S. Cl.
CPC ....... *G02B 30/25* (2020.01); *G02F 1/133504* (2013.01); *G02F 1/133526* (2013.01); *G02B 2027/0174* (2013.01)

(56) References Cited

U.S. PATENT DOCUMENTS

| | | | |
|---|---|---|---|
| 2002/0126332 A1* | 9/2002 | Popovich | G02B 5/32 359/15 |
| 2010/0027289 A1* | 2/2010 | Aiki | G02B 6/0011 362/558 |
| 2013/0242262 A1 | 9/2013 | Lewis | |
| 2013/0322810 A1* | 12/2013 | Robbins | G02B 6/4206 385/11 |
| 2014/0160543 A1* | 6/2014 | Putilin | G02B 27/0103 359/9 |
| 2015/0312558 A1 | 10/2015 | Miller et al. | |
| 2016/0231566 A1 | 8/2016 | Levola et al. | |
| 2021/0333551 A1* | 10/2021 | Schultz | G02B 27/0172 |

OTHER PUBLICATIONS

D. Cheng et al., "Design of an optical see-through head-mounted display with a low f-number and large field of view using a freeform prism," Appl. Opt. 48, 2655-2668 (2009).

* cited by examiner

OPTICAL DISPLAY SYSTEM, METHOD, AND APPLICATIONS

CROSS REFERENCE TO RELATED APPLICATIONS

This application is a continuation-in-part (CIP) application of PCT application number PCT/US16/65755 entitled "OPTICAL DISPLAY SYSTEM, METHOD, AND APPLICATIONS" filed Dec. 9, 2016, the subject matter being herein incorporated by reference in its entirety.

FEDERALLY SPONSORED RESEARCH

The invention was made with funding from the Air Force Office of Scientific Research (AFOSR) under project #6501-6269. The U.S. government has certain rights in the invention.

FIELD

This Disclosure relates to optical display systems including augmented reality systems that include a controllable optical image-generating apparatus and an optical image-viewing apparatus, and to virtual reality systems that include a controllable optical image display/view apparatus.

BACKGROUND

Virtual reality and augmented reality are emerging wearable display technologies for applications including but not limited to immersive video games and interactive 3D graphics. A critical issue with these types of display devices is distance matching. For stereoscopic 3D displays that are based on sending different images to different eyes, e.g., OCULUS RIFT, the perceived (virtual) image may locate at a distance different from the eye's focal length, thus causing eye-brain conflict and eye strain. For devices such as GOOGLE GLASS, a major problem is the mismatch between the distance of a displayed (generated or virtual) image and the surrounding (environmental or real) image because the displayed image remains in a certain plane. In this case, the viewer cannot focus on the generated image from the device and the surrounding objects simultaneously. In either case mentioned above, a need and capability to 'distance match' is evident and advantageous.

Distance matching may be enabled by a controllable image-generating apparatus that can controllably change/vary the distance of the generated (display) image plane, and which can match it with the surrounding real image field.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize that an appropriate optical image viewing apparatus (e.g., one capable of controllable distance matching having no moving parts per se) coupled to an appropriate optical (image-generating) display apparatus may address the needs and solve the problems associated with current 'wearable' and/or 'head-wearable' displays for, e.g., virtual and/or augmented reality systems.

One disclosed aspect comprises an optical display system including a controllable optical image-generating display apparatus and an optical image viewing apparatus. In a non-limiting example embodiment the optical image-generating apparatus has an optical axis and includes a programmable/controllable (virtual) image-generating component adapted to generate a polarized image output; a polarization rotator disposed to accept the polarized image output; and a polarization dependent optical element disposed to accept an output from the polarization rotator, and the optical image-viewing apparatus includes a total internal reflection (TIR) light guide disposed transverse to the optical axis of the optical image-generating apparatus; a single input holographic coupler disposed at an input region of the TIR light guide; and a single output holographic coupler disposed at an output region of the TIR light guide.

In various embodiments, the optical display system may include, the following limitations, features, characteristics and/or elements:

- wherein the polarized image output is one of linear and circular polarized;
- wherein the distance between the polarization rotator and the polarization-dependent component is equal to or less than 10 cm;
- wherein the polarization-dependent component is a diffractive liquid crystal wave-plate;
- wherein the polarization-dependent component is a combination of a diffractive liquid crystal wave-plate and a polarization-independent lens disposed adjacently or in contact;
- wherein the polarization-dependent component is a birefringent lens;
- wherein the polarization-dependent component is a combination of a birefringent lens and a polarization-independent lens disposed adjacently or in contact;
- wherein the optical image-viewing apparatus further comprises a second TIR light guide disposed adjacent to be within 5 cm of the first TIR light guide, wherein the second TIR light guide includes a single second input holographic coupler disposed correspondingly adjacent to the input holographic coupler and a single second output holographic coupler disposed correspondingly adjacent the output holographic coupler, wherein the input holographic coupler operationally deflects a green component of the output from the optical image-generating apparatus in the TIR light guide and operationally transmits a red and a blue component of the output from the optical image-generating apparatus, wherein the second input holographic coupler operationally deflects the red and the blue components in the second TIR light guide, wherein the second output holographic coupler operationally deflects the red and the blue components to the output holographic coupler, and wherein the output holographic coupler operationally deflects the green component and operationally transmits the red and the blue components in the form of an output image of the optical display system;
- further comprising a support structure such that the optical display system is wearable by a viewer.

Another disclosed aspect is a method for method of providing a viewable image to a viewer. In an exemplary, non-limiting embodiment the method includes the steps of providing an optical image-generating apparatus having an optical axis, including a programmable/controllable (virtual) image-generating component adapted to generate a polarized image output; a polarization rotator disposed to accept the polarized image output; and a polarization dependent component disposed to accept an output from the polarization rotator; using the polarization rotator to controllably change a polarization state of the polarized image output; using the polarization dependent optical element to change a distance and/or a size of the viewable image to the viewer. In various non-limiting embodiments, the method may include, alone or in various combinations as one skilled in the art would understand, the following steps, limitations, features, characteristics and/or elements:

further comprising inputting the output from the polarization dependent optical element to an optical image-viewing apparatus, including a TIR light guide disposed transverse to the optical axis of the optical image-generating apparatus; a single input holographic coupler disposed at an input region of the TIR light guide; and a single output holographic coupler disposed at an output region of the TIR light guide;

further comprising electrically changing the polarization state of the polarized image output;

further comprising generating at least one of a linear and a circular polarized image output.

A distinguishing technical feature of all of the aspects and embodiments involves selectively controlling at least two distinct polarization states of a display-generated (virtual) image to effect different focal lengths or different image distances and magnifications of the image as seen by a viewer.

Also disclosed is an electrically controllable optical imaging system (and associated methods) in which a liquid crystal panel (without polarizers or color filters), advantageously a twisted nematic (TN) panel, is utilized to control the input light polarization from a polarized display device. Different polarization states lead to different path lengths in the optical system that includes either a polarizing beam splitter, a wire-grid polarizer, a dual-brightness enhancement film, a uniaxial plate or a biaxial plate, or the combination of these components, which in turn results in different focal lengths or different viewed image distances and magnifications upon controlling the TN panel electrically.

BRIEF DESCRIPTION OF THE FIGURES

Reference will now be made to the accompanying drawings, which are not necessarily drawn to scale, wherein.

DETAILED DESCRIPTION

Figure 1:
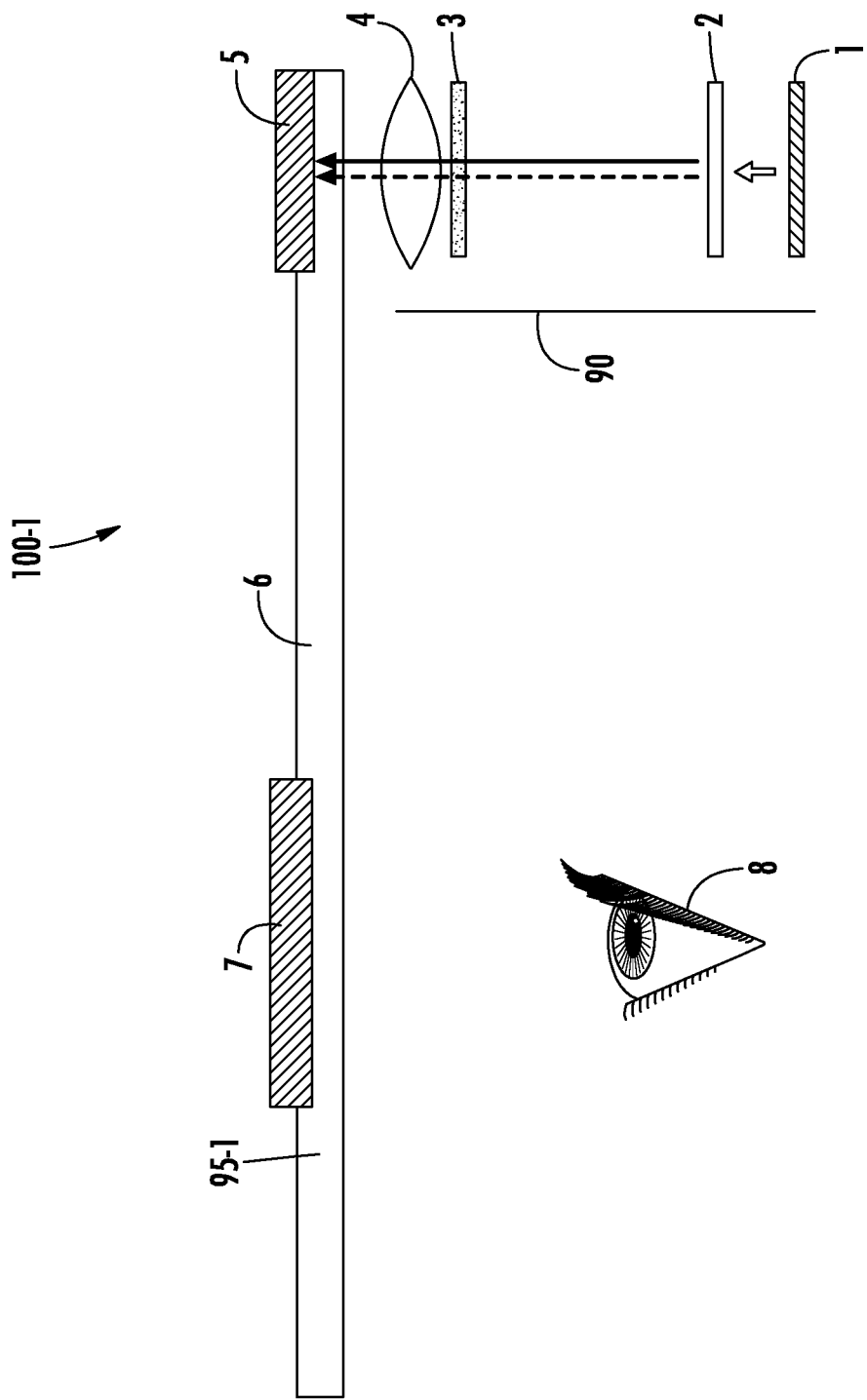
FIG. 1 is a top schematic plan view of an optical display system according to an example augmented reality application embodiment of the invention.

Example aspects are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this Disclosure.

FIG. 1 schematically illustrates an optical display system 100-1. The optical display system 100-1 has two general operational parts comprising an optical image-generating apparatus 90 and an optical image-viewing apparatus 95-1.

The optical image-generating apparatus 90 comprises a programmable/controllable (virtual image) display component 1 that is optically followed by a polarization rotator 2, a polarization dependent component 3, and optionally (as necessary) a lens 4.

The optical image-viewing apparatus 95-1 includes a TIR light guide 6, including a single input holographic coupler 5 and a single output holographic coupler 7.

In regard to the optical image-generating apparatus 90, the display component 1 can be a micro-LCD display, a LCoS display, a micro-LED display, an OLED display, a fiber scanning display, or other display component as known in the art. The display component outputs or is adapted to output a polarized light (virtual) image, most advantageously a linearly polarized or circularly polarized image. Typically, display components such as micro-LCD and LCoS displays produce polarized outputs. If the display output is not inherently polarized, as produced by, e.g., a micro-LED display, an OLED display, or a fiber scanning display, a polarizer will generally be disposed on the output side of the display component to effect a desired polarization state image output.

The polarization rotator 2 can be a twisted nematic liquid crystal cell, a vertically-aligned liquid crystal cell, a ferroelectric liquid crystal cell, or other suitable device known in the art that enables control (advantageously, electronic) of the display output polarization state. The polarization rotator can be used to selectively switch the output display polarization state.

The polarization dependent optical component 3 can be a liquid crystal lens, a diffractive liquid crystal wave-plate with or without a lens for proper focal length control and collimation, or other suitable device known in the art. The polarization dependent optical component has a different focal length for left-handed circular polarization and right-handed circular polarization states or s- and p-linear polarization states. Therefore, through the modulation of the polarization rotator, different focal lengths, f1 and f2, can be obtained. The distance, d, between the, e.g., diffractive liquid crystal wave-plate and the display is fixed and is smaller than either focal length (f1 and f2), and therefore the display is magnified in both size and distance. When d is smaller but close to the focal length, the magnification is larger and the image distance is farther. When d is even smaller, the magnification is smaller and the distance is closer. A good estimation can be obtained through the lens maker's formula:

$$1/d - 1/d' = 1/f,$$

where f is the focal length, d is the distance between the lens and the display, and d' is the distance between the lens and the magnified display image, which is also the distance perceived by the human eye. Therefore, by properly choosing d, f1, and f2, one can switch between two specific perceived distances d1' and d2'. The combination of the polarization rotator 2 and the polarization dependent optical component 3 enables a controllable, switchable display distance, thus providing an advantageous light field display similar to that depicted in a paper by Lee, Seungjae, et al.

"Additive light field displays: realization of augmented reality with holographic optical elements," ACM Transactions on Graphics (TOG) 35.4 (2016): 60.

Figure 2:
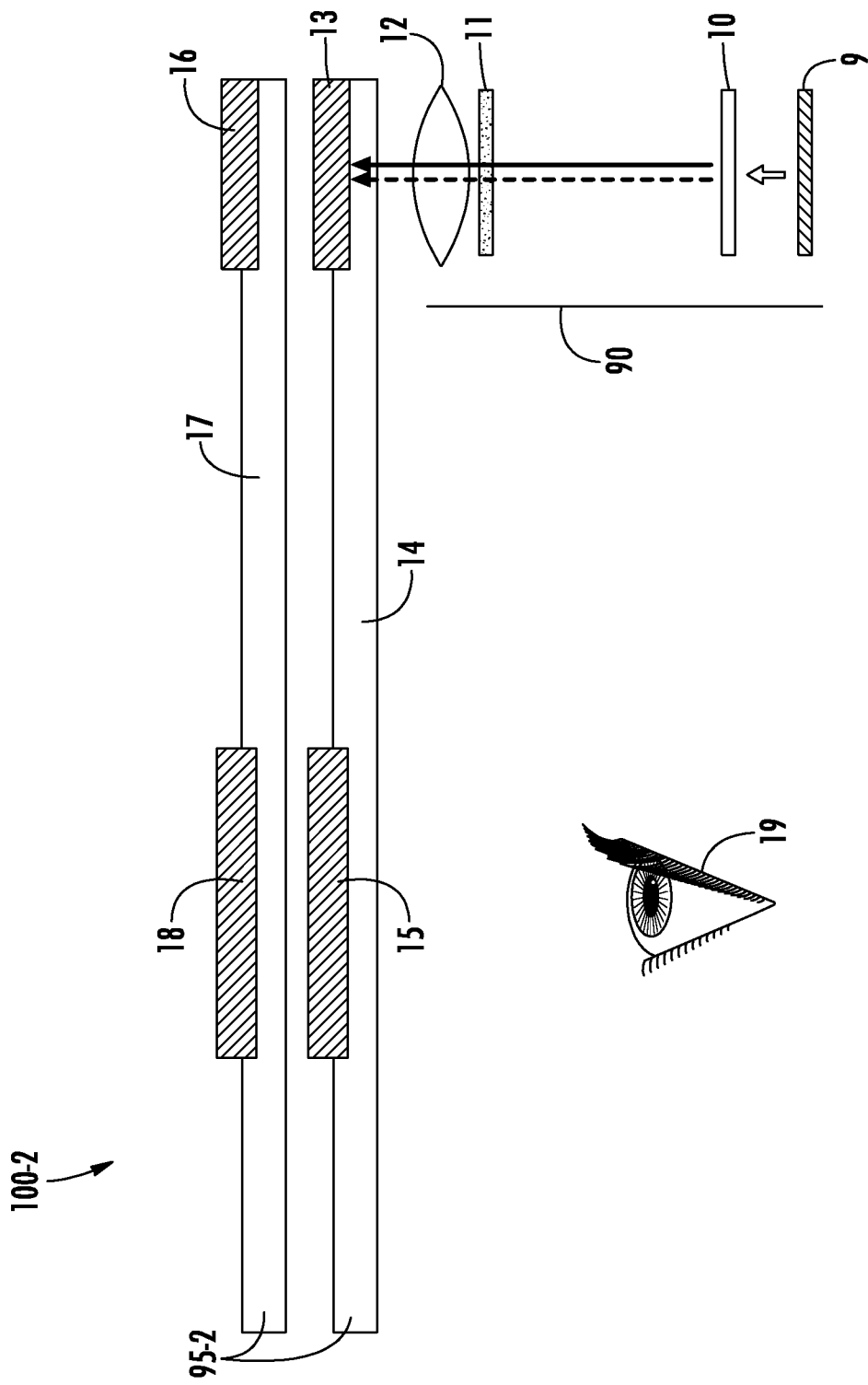
FIG. 2 is a top schematic plan view of an optical display system according to an example augmented reality application embodiment of the invention.

The lens 4 may be disposed to assign proper bias to the overall focal length of the optical image-generating apparatus 90. The lens 4 may be disposed optically behind the polarization dependent component 3 as shown in FIGS. 1 and 2, or optically in front of the polarization dependent component 3, as a person skilled in the art would appreciate.

The optical image-viewing apparatus 95-1 including the TIR light guide 6, the input holographic coupler 5, and the output holographic coupler 7 is similar in form and function to the corresponding elements disclosed in U.S. Pat. No. 8,810,878. The input holographic coupler 5 and the output holographic coupler 7 are reflection-volume holographic gratings as known in the art.

The light/image output from the output holographic coupler 7 is directed to a viewer's eye 8. By controlling the polarization of the displayed light through the polarization rotator, the polarization dependent optical element changes the displayed content to different distances from the viewer's eye. This enables the generation of a proper light field, which will then be coupled into the light guide through the input holographic coupler, and finally go through the output holographic coupler to the user's eye.

A practical embodiment of the display system may be in the form of a pair of glasses with a symmetric configuration for left and right eyes. FIG. 1 only depicts the setup for the right eye of a viewer. Practical dimensions are provided as follows: The distance from item 1 to 5 is less than 10 cm; the size of item 6 is less than 5 cm in height and less than 10 cm in width; the distance from 7 to 8 is less than 3 cm.

FIG. 2 schematically illustrates an alternative optical display system 100-2 that is similar to display system 100-1 except that the optical image-viewing apparatus 95-2 comprises two TIR light guides 14, 17 each including respective input holographic couplers 13, 16 and output holographic couplers 15, 18. In optical display system 100-2, the green component of the image-generating output is deflected by the input holographic coupler 13 and guided into light guide 14. The light travels in light guide 14 and is deflected by the output holographic coupler 15 to the user's eye. Similarly, the red and blue components of the display output is deflected by the input holographic coupler 16 and guided into light guide 17. The light travels in light guide 17 and is deflected by the output holographic coupler 18 to the user's eye. The optical image-viewing apparatus 95-1 includes the TIR light guide 6, the input holographic coupler 5, and the output holographic coupler 7.

In FIG. 2 embodiment, practical example dimensions are provided as follows: the distance from item 9 to 16 is less than 10 cm, and the sizes of item 14, 17 are less than 5 cm in height and less than 10 cm in width.

Figure 3:
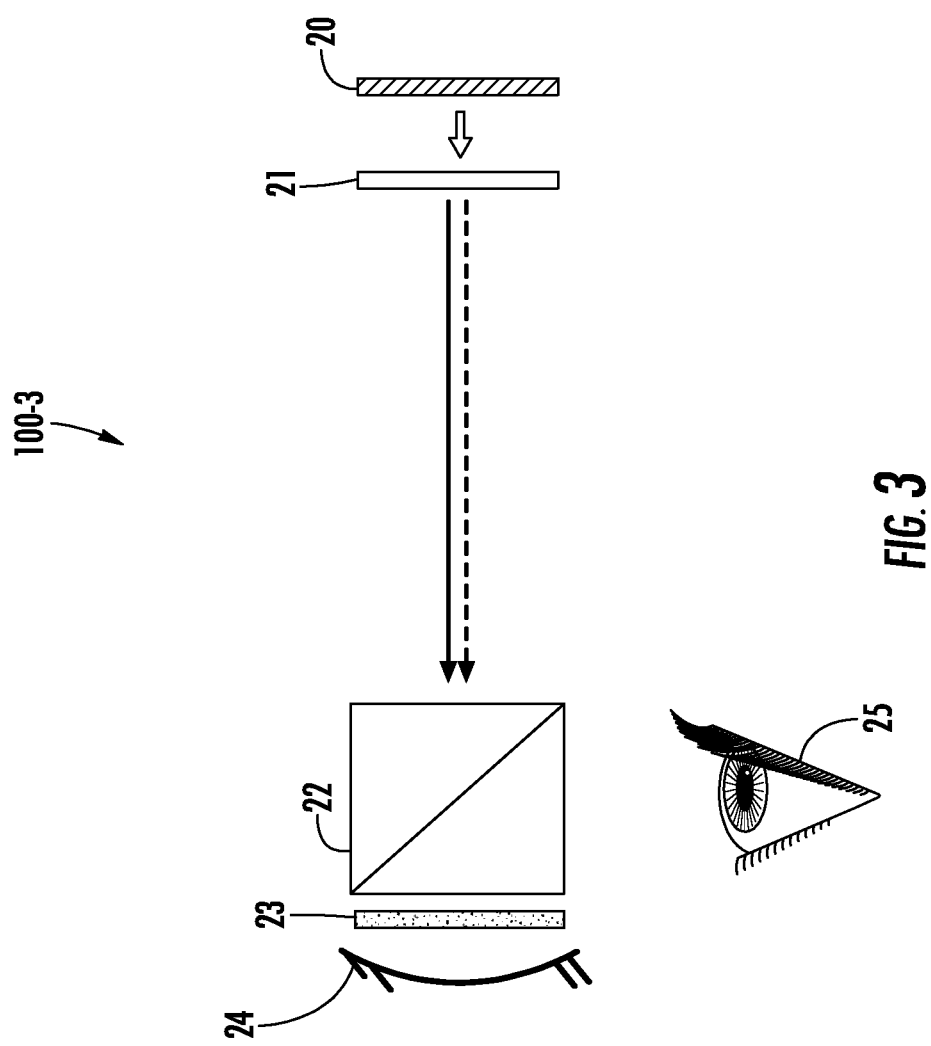
FIG. 3 is a top schematic plan view of an optical display system according to an example embodiment of the invention.

FIG. 3 schematically illustrates an optical display system 100-3. In this example embodiment, the polarized light from display 20 is sent to the polarization rotator 21, the polarization rotator can switch between two different polarization states. Then the light travels to a beam splitter 22 (a beam splitting cube or a semi-reflecting mirror placed at 45°). A polarization dependent optical component 23, advantageously a diffractive liquid crystal wave-plate, is disposed after the beam-splitting cube (or a semi-reflecting mirror placed at 45°) so that different polarization states experience different focusing powers. A reflector 24, advantageously a concave mirror, is disposed at the output side of the polarization dependent optical component 23 to reflect and further collimate the displayed light. Upon reflection, the displayed light will travel through the polarization dependent optical component 23 again and be further collimated, after which the reflected display light will be reflected 45° at the beam splitter 22 toward the viewer's eye 25. A compensating waveplate (not shown) may be disposed between item 23 and 24 to correct the polarization.

Figure 4:
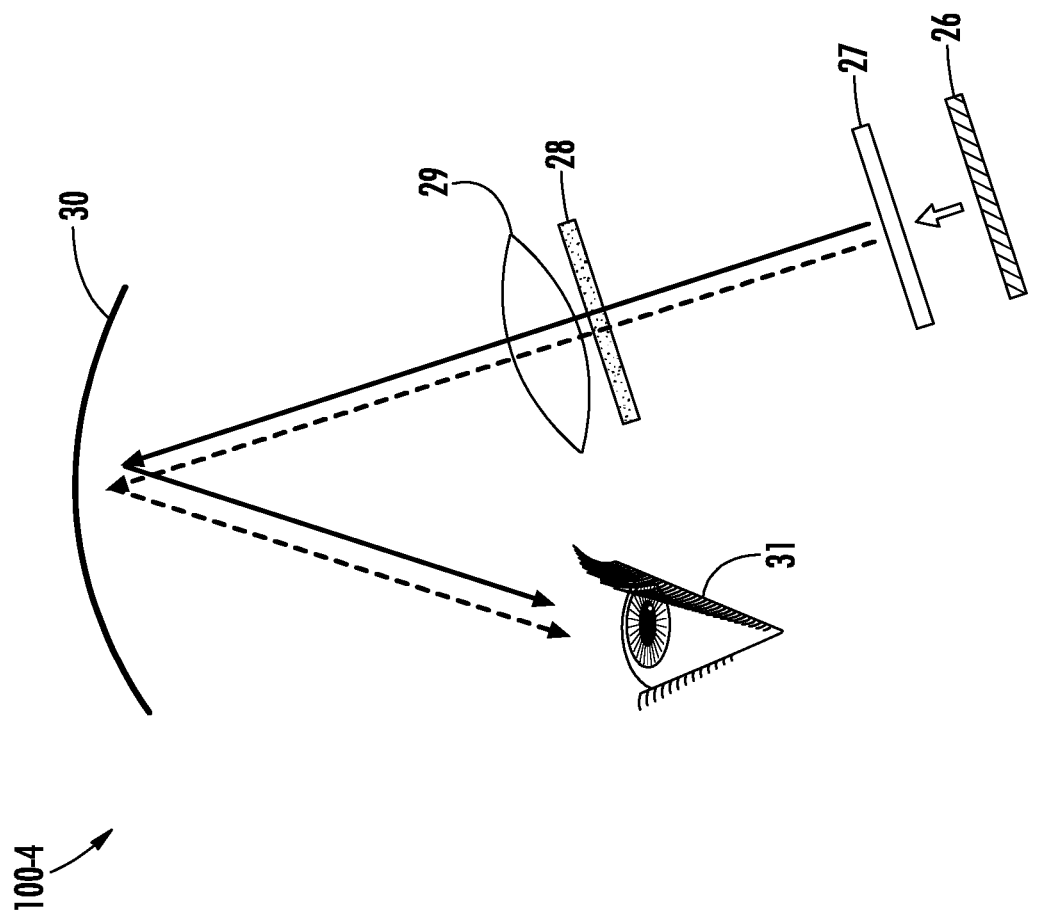
FIG. 4 is a top schematic plan view of an optical display system according to an example embodiment of the invention.

FIG. 4 schematically illustrates an optical display system 100-4. In this example embodiment, the polarized light from display 26 is sent to the polarization rotator 27; the polarization rotator can switch between two different polarization states. A polarization dependent optical component 28, advantageously a diffractive liquid crystal wave-plate, is disposed after the polarization rotator so that different polarization states experience different focusing powers. A polarization independent lens 29, is disposed at the output side of the polarization dependent optical component to further collimate the displayed light. The location of items 28 and 29 is interchangeable. The displayed light is then reflected by a semi-transparent mirror 30, advantageously a slightly-concaved semi-transparent mirror with transparency between 20% and 80%, toward a viewer's eye 31.

Figure 5:
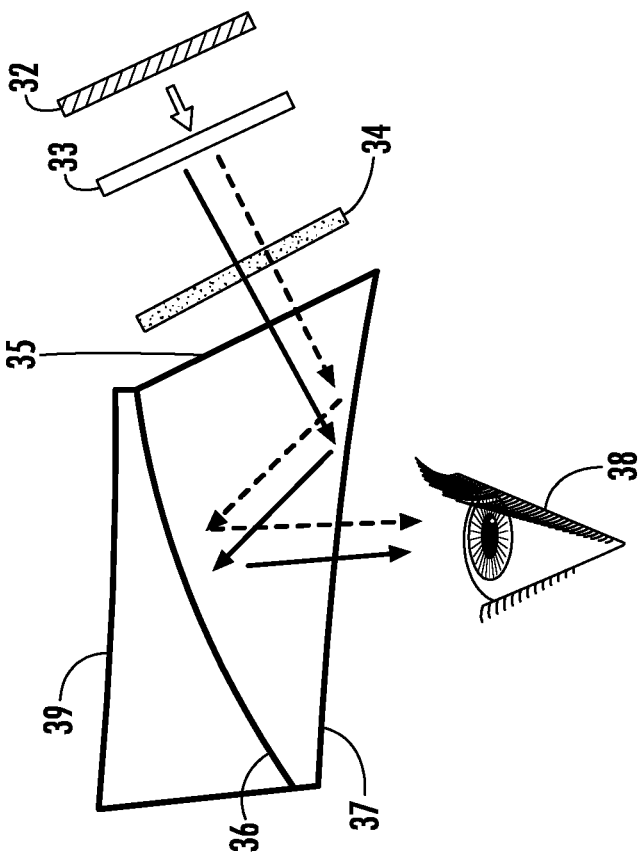
FIG. 5 is a top schematic plan view of an optical display system according to an example embodiment of the invention.

FIG. 5 schematically illustrates an optical display system 100-5. In this example embodiment, the polarized light from display 32 is sent to the polarization rotator 33; the polarization rotator can switch between two different polarization states. A polarization dependent optical component 34, advantageously a diffractive liquid crystal wave-plate, is disposed after the polarization rotator so that different polarization states experience different focusing powers. A polarization independent lens 35, is disposed at the output side of the polarization dependent optical component to further collimate the displayed light. The surface(s)s of the lens is engineered as a free-form lens, similar to the one reported by D. Cheng et al., "Design of an optical see-through head-mounted display with a low f-number and large field of view using a freeform prism," Appl. Opt. 48, 2655-2668 (2009), such that the displayed light is slightly collimated when it enters into 35, total-internally reflected at interface 36, collimated further at interface 37, and finally directed to a viewer's eye 38. A compensating prism 39 is disposed such that the light from the ambient environment (thick solid arrow) is not distorted after being refracted at interfaces 39, 36 and 37.

Figure 6:
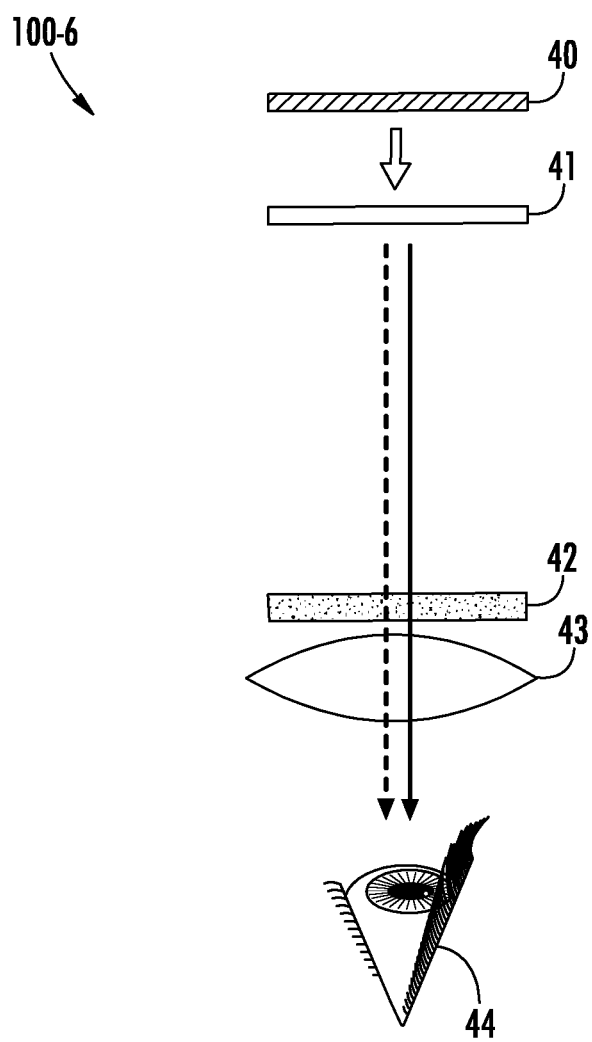
FIG. 6 is a top schematic plan view of an optical display/view system according to an example virtual reality application embodiment of the invention.

While the above disclosed embodiments may be particularly advantageous in augmented reality applications where the viewer also views a real-world scene and the virtual, display-generated scene, enabled by the optical image-viewing apparatus 95-1 or 95-2, FIG. 6 illustrates a controllable optical image display/view system 100-6 that does not include an optical image-viewing apparatus such as 95-1 or 95-2. Instead, the controllable optical image display/view system 100-6 is made up of an image-generating component 40 disposed with its polarized output light going to a polarization rotator 41, which can control the polarization of the displayed light between desired polarization states electrically, as in the FIG. 1 and FIG. 2 embodiments. A polarization dependent component 42 is disposed at some distance after the output side of the polarization rotator. A lens 43 may be disposed to assign proper bias to the overall focal length. The location of 42 and 43 are interchangeable. A wearable fitting support such as a cushion for users' comfort and eye-positioning (e.g., eyeglass-type frame, not shown) can be disposed after 42/43 so that the user's eye 44 is comfortably and operationally close to the final output component.

Those skilled in the art to which this Disclosure relates will appreciate that many variations of disclosed aspects are possible within the scope of the claimed invention, and further additions, deletions, substitutions and modifications may be made to the above-described aspects without departing from the scope of this Disclosure.

We claim:

1. An optical display system, comprising:
   an optical image-generating apparatus having an optical axis, including:
      a programmable/controllable (virtual) image-generating component adapted to generate a polarized image output;
      a polarization rotator disposed to accept the polarized image output and adapted to control a polarization state of the image output between at least two different polarization states; and
      a polarization dependent component disposed to accept an output from the polarization rotator and having a different focal length for each of the different polarization states of the image output; and
   an optical image-viewing apparatus, including:
      a single total internal reflection (TIR) light guide disposed transverse to the optical axis or the optical image-generating apparatus;
      a single input holographic coupler disposed at an input region of the TIR light guide; and
      a single output holographic coupler disposed at an output region of the TIR light guide
   wherein different image distances of the image seen by a viewer can be displayed.

2. The optical display system or claim 1, wherein the polarized image output is linear polarized or is circular polarized.

3. The optical display system of claim 1, wherein a distance between the polarization rotator and the polarization-dependent component is equal to or less than 10 cm.

4. The optical display system of claim 1, wherein the polarization-dependent component comprises a diffractive liquid crystal wave-plate.

5. The optical display system of claim 1, wherein the polarization-dependent component is a combination of a diffractive liquid crystal wave-plate and a polarization-independent lens disposed adjacent or in contact.

6. The optical display system of claim 1, wherein the optical image-viewing apparatus further comprises a second TIR light guide, wherein the second TIR light guide includes a single second input holographic coupler disposed correspondingly adjacent to the single first input holographic coupler and a single second output holographic coupler disposed correspondingly adjacent the first output holographic coupler, wherein the first input holographic coupler operationally deflects a green component of the output from the optical image-generating apparatus in the first TIR light guide and operationally transmits a red and a blue component of the output from the optical image-generating apparatus, wherein the second input holographic coupler operationally deflects the red and the blue components in the second TIR light guide, wherein the second output holographic coupler operationally deflects the red and the blue components to the output holographic coupler, and wherein the first output holographic coupler operationally deflects the green component and operationally transmits the red and the blue components in the form of an output image of the optical display system.

7. The optical display system of claim 1, further comprising a support structure such that the optical display system is wearable by a viewer.

8. An optical image display/view system, comprising:
   a programmable/controllable image-generating component adapted to generate a polarized image output;
   a polarization rotator disposed to accept the polarized image output and adapted to control the polarization of the polarized image output between desired polarization states; and
   a polarization dependent component disposed to accept an output from the polarization rotator and having a different focal length for each of the different polarization states of the image output.

9. The optical image display/view system of claim 8, further comprising a reflector disposed optically after the polarization dependent component.

10. The optical image display/view system of claim 8, further comprising an engineered free-form lens adapted so that light can be guided into the lens disposed at the output side or the polarization dependent component.

11. The optical image display/view system of claim 8, further comprising a lens disposed either optically in front of or behind the polarization dependent component.

12. The optical image display/view system of claim 8, wherein a distance between the polarization rotator and the polarization-dependent component is equal to or less than 10 cm.

13. The optical image display/view system of claim 8, wherein the polarization-dependent component is a diffractive liquid crystal wave-plate.

14. The optical image display/view system of claim 8, wherein the polarization-dependent component is a combination of a diffractive liquid crystal wave-plate and a polarization-independent lens disposed adjacently or in contact.

15. The optical image display/view system of claim 8, wherein the polarization-dependent component is a combination of a birefringent lens and a polarization-independent lens disposed in adjacent or in contact.

16. A method of providing a viewable image to a viewer, comprising:
   providing an optical image-generating apparatus having an optical axis, including a programmable/controllable (virtual) image-generating component adapted to generate a polarized image output; a polarization rotator disposed to accept the polarized image output; and a polarization dependent optical element disposed to accept an output from the polarization rotator;
   using the polarization rotator to controllably change a polarization state of the polarized image output between at least two polarization states; and
   using the polarization dependent optical element to obtain a different focal length corresponding to a respective polarization state
   wherein different image distances of the image seen by a viewer can be displayed.

17. The method or claim 16, further comprising inputting an output from the polarization dependent optical element to an optical image-viewing apparatus including at least one total internal reflection (TIR) light guide disposed transverse to the optical axis of the optical image-generating apparatus; a single input holographic coupler disposed at an input region of the TIR light guide; and a single output holographic coupler disposed at an output region of the TIR light guide.

18. The method of claim 16, further comprising electrically changing the polarization state of the polarized image output.

19. The method of claim 16, further comprising generating at least one of a linear polarized image output and a circular polarized image output.

* * * * *